United States Patent

Pate

[11] Patent Number: 6,071,172
[45] Date of Patent: Jun. 6, 2000

[54] ADJUSTABLE TURKEY CALL

[76] Inventor: James A. Pate, 31209 Norred Rd., Albany, La. 70711

[21] Appl. No.: 09/135,918

[22] Filed: Aug. 18, 1998

[51] Int. Cl.[7] .................................................. A63H 5/00
[52] U.S. Cl. ........................................... 446/397; 446/402
[58] Field of Search .................................... 446/397, 402, 446/489; 84/402, 404; 43/1, 2

[56] References Cited

U.S. PATENT DOCUMENTS

| | | | |
|---|---|---|---|
| 1,449,756 | 3/1923 | Jackson | 446/397 |
| 2,958,157 | 11/1960 | Tannehill | 446/397 |
| 4,041,639 | 8/1977 | Funk | 446/397 |
| 4,387,531 | 6/1983 | Jacob | 446/418 X |
| 4,422,262 | 12/1983 | Moss | 446/418 X |
| 4,606,733 | 8/1986 | Willis | 446/397 |
| 4,854,914 | 8/1989 | White, Jr. | 446/402 |
| 4,941,858 | 7/1990 | Adams | 446/404 X |
| 5,503,585 | 4/1996 | Heineman | 446/397 |

*Primary Examiner*—Sam Rimell

[57] ABSTRACT

An adjustable turkey call having an adjustment base, a sound block positioned on the adjustment base, and a call box having a striker plate. The call box forms a sound chamber. The call box is slidably disposed on the adjustment base such that the sound chamber can be selectively positioned relative to the sound block. The call box is preferably provided with a duct on a front end for assisting sound in emanating from the sound chamber. Slots are preferably positioned along opposite sides of the adjustment base. Side walls of the call box are preferably provided with inward projections which are sized and positioned to slidably engage the slots on the adjustment base. Indicia can be provided on the call box and the adjustment base to provide position markers for selectively positioning the sound chamber relative to the sound block.

12 Claims, 3 Drawing Sheets

ADJUSTABLE TURKEY CALL

FIELD OF THE INVENTION

The present invention relates generally to devices for producing animal sounds, and more particularly to an adjustable turkey call for producing different turkey attracting sounds.

BACKGROUND OF THE INVENTION

A turkey hunter or competition turkey caller typically remains sitting or standing in one position and uses a turkey call to produce turkey sounds in an attempt to lure turkeys to his or her position. The more authentic the sound produced by the turkey call, the more likely it is that a turkey will be to be attracted to the caller. Many types of calls have been devised in an attempt to produce authentic turkey sounds. Some turkey calls are mouth operated, while others are hand operated. Hand operated turkey calls typically employ a striker plate and a striker. The striker is rubbed or struck on the striker plate in order to produce a turkey attracting sound. The striker plate is typically mounted on a call box housing. The call box serves to modify the sound produced when the striker is applied to the striker plate. The call box can be provided with one or more holes to assist emanation of sounds from the box. The striker plate is typically made of slate, but other materials, such as glass, plastic, metal (e.g. aluminum), and wood, can be used. The call box is usually made of wood or plastic. The striker is usually made of wood, metal, plastic, or glass.

While prior art turkey calls can produce authentic turkey sounds, such devices suffer from the disadvantage of being unable to produce an authentic range of sounds, such as would be produced by a wild turkey. Accordingly, the present invention is directed to providing a turkey call that can produce a range of turkey notes or tones, and thereby enhance the turkey attracting quality of the call.

OBJECTS AND SUMMARY OF THE INVENTION

It is an object of the invention to provide an adjustable turkey call that enables a user to selectively alter the turkey attracting sound produced by the call.

It is another object of the invention to provide a turkey call that has indicia markers for selecting and reselecting particular turkey attracting notes or tones.

It is another object of the invention to provide an adjustable turkey call that can be operated with conventional strikers.

It is another object of the invention to provide an adjustable turkey call that is easy to operate.

It is another object of the invention to provide an adjustable turkey call that is sufficiently durable to withstand the rigors of hunting.

These and other objects and advantages of the invention shall become apparent from the following general and preferred description of the invention.

Accordingly, an adjustable turkey call is provided comprising an adjustment base, a sound block positioned on the adjustment base, and a call box having a striker plate. The call box forms a sound chamber. The call box is slidably disposed on the adjustment base such that the sound chamber can be selectively positioned relative to the sound block. The call box is preferably provided with a duct on a front end for assisting sound in emanating from the sound chamber. Slots are preferably positioned along opposite sides of the adjustment base. The side walls of the call box are preferably provided with inward projections which are sized and positioned to slidably engage the slots on the adjustment base. Indicia can be provided on the call box and the adjustment base to provide position markers for selectively positioning the sound chamber relative to the sound block.

PREFERRED EMBODIMENTS OF THE INVENTION

Figure 1:
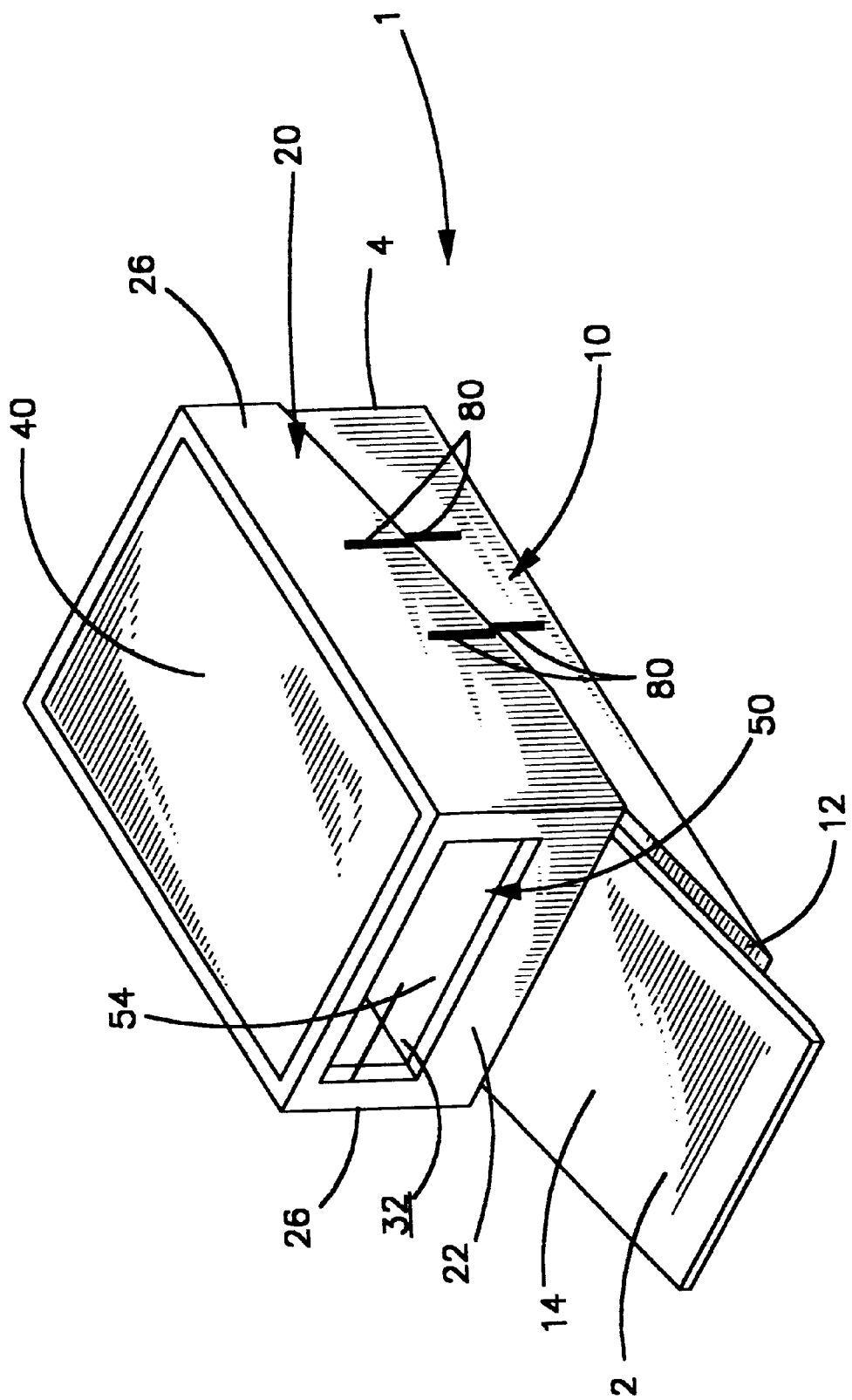
FIG. 1 is a front-side perspective view of one embodiment of the invention illustrating the invention in a rear-most position.

As shown in FIG. 1, the adjustable turkey call of the invention 1 comprises, generally, an adjustment base 10, a sound block 50 positioned on the adjustment base 10, and a call box 20. The call box 20 forms a sound chamber 30, as will be described further below. For purposes of describing the invention 1, the turkey call can be considered as having a front end 2 and a back end 4. The front end 2 can be considered the end having the duct 32 or, if no duct is provided, the end which provides the greatest distance between the lower surface 46 of the striker plate and the upper surface 14 of the adjustment base 10. However, terms such as "front end," "back end," "upper," "lower," and the like are relative with regard to this invention, and it should be apparent that they are used herein primarily for descriptive purposes.

Figure 2:
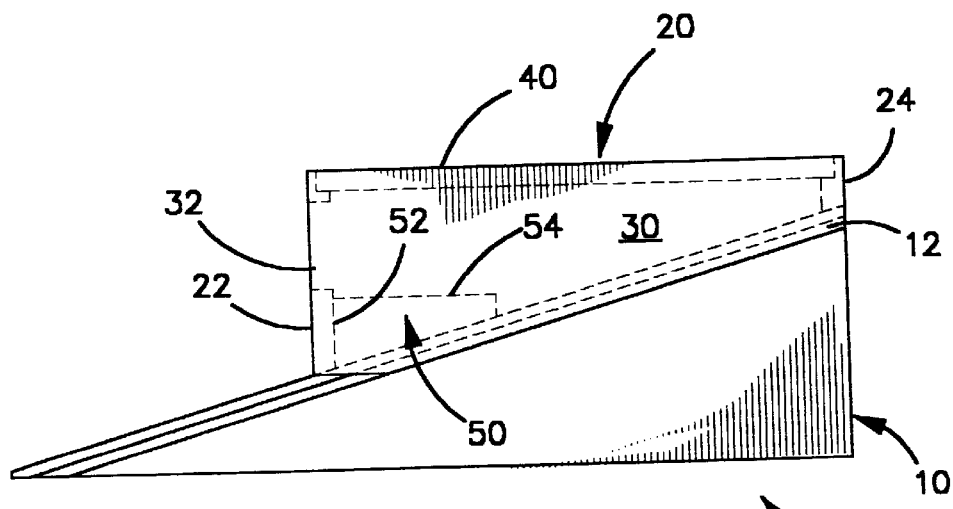
FIG. 2 is a side view of one embodiment of the invention illustrating the invention in a rear-most position and showing a partial cross-section of the call box and sound chamber.
Figure 3:
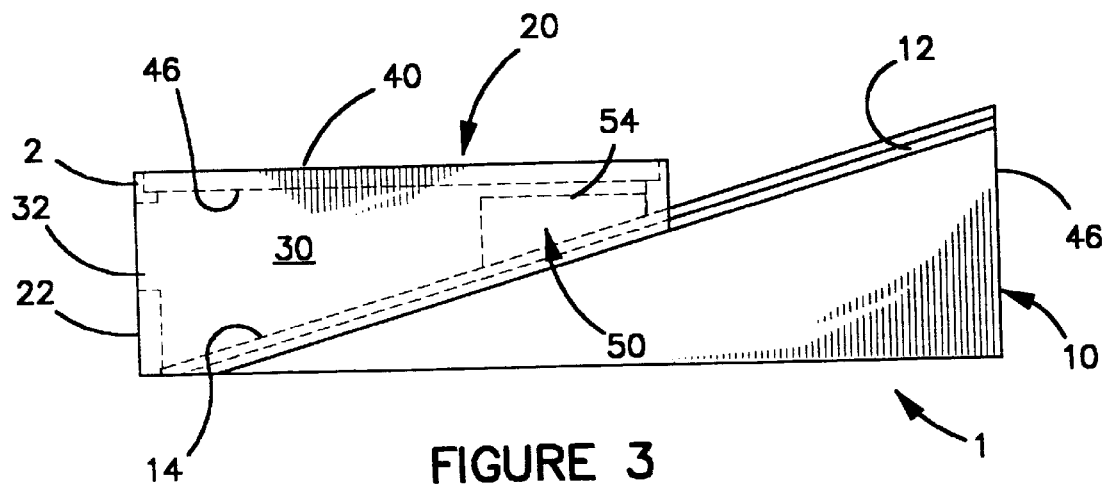
FIG. 3 is a side view of one embodiment of the invention as shown in FIG. 1 illustrating the invention in a forward-most position and showing a partial cross-section of the call box and sound chamber.

The adjustment base 10 preferably has a flat upper surface 14, as shown in FIGS. 1–3. However, the upper surface 14 can be curved or irregular. The upper surface 14 of the adjustment base 10 forms a bottom surface of the sound chamber 30. As shown most clearly in FIGS. 2 and 3, in a preferred embodiment the adjustment base 10 has a substantially triangular side-view profile. A triangular adjustment base 10 allows the base 10 to be compact and easy to hold. However, the adjustment base 10 could be other shapes, such as rectangular.

The sound block 50 is fixedly positioned on the adjustment base 10. The sound block 50 is positioned such that when the call box 20 is slid relative to the adjustment base 10, the space between the upper surface 54 of the sound block 50 and the lower surface 46 of the striker plate 40 becomes larger or smaller. The sound block can be configured in many shapes and sizes, but will typically be substantially the width of the sound chamber, and short enough to allow a desired range of forward and rearward motion of the call box 20. As shown most clearly in FIGS. 2 and 3, in a preferred embodiment the sound block 50 has a substantially triangular side-view profile. A triangular sound block 50 contributes to the dampening/undampening effect of the apparatus when the call box 20 is moved from one position to another relative to the sound block 50.

The call box 20, which forms the sound chamber 30, is slidably disposed on the adjustment base 10 such that the sound chamber 30 can be selectively positioned relative to the sound block 50. As shown most clearly in FIGS. 2 and 3, in a preferred embodiment the call box 20 has at least a partial triangular side-view profile. The triangular shape of the call box 20 contributes to the dampening/undampening effect of the apparatus when the call box 20 is moved from one position to another relative to the sound block 50, particularly when used in combination with a triangular sound block 50.

The call box 20 has a striker plate 40. At least a portion of the striker plate 40 is located on or forms part of the outer surface of the call box 20. An inner surface 46 of the striker plate 40 typically forms part of the sound chamber 30. The striker plate 40 is preferably positioned on a top surface of the call box 20. A pair of side walls 26 depend downward from the top surface of the call box 20. As shown in FIGS. 1–3, a backstop 24 is preferably provided on a back end of the call box 20. The backstop 24 is preferably sized to close or substantially close the back end of the call box 20. As shown in FIGS. 1–3, a front stop 22 is preferably provided on a front end of the sound chamber 30. The front stop 22 is preferably positioned to contact a front end of the sound block 50 when the sound chamber 30 is positioned in a rear-most position. When the call box 20 is provided with a front stop 22 and a rear stop 24, the sound block 50 prevents the call box 20 from sliding off of the adjustment base 10 by abutting against the front stop when the call box 20 is in a rearward-most position (see FIG. 2), and by abutting against the back stop when the call box 20 is in a forward-most position (see FIG. 3).

As shown in FIGS. 1–3, the call box 20 is preferably provided with one or more ducts 32 to assist sound produced in the sound chamber 30 in emanating from the call box 20. The duct 32 is preferably positioned on a front end of the sound chamber 30, as shown in FIGS. 1–4.

Figure 4:
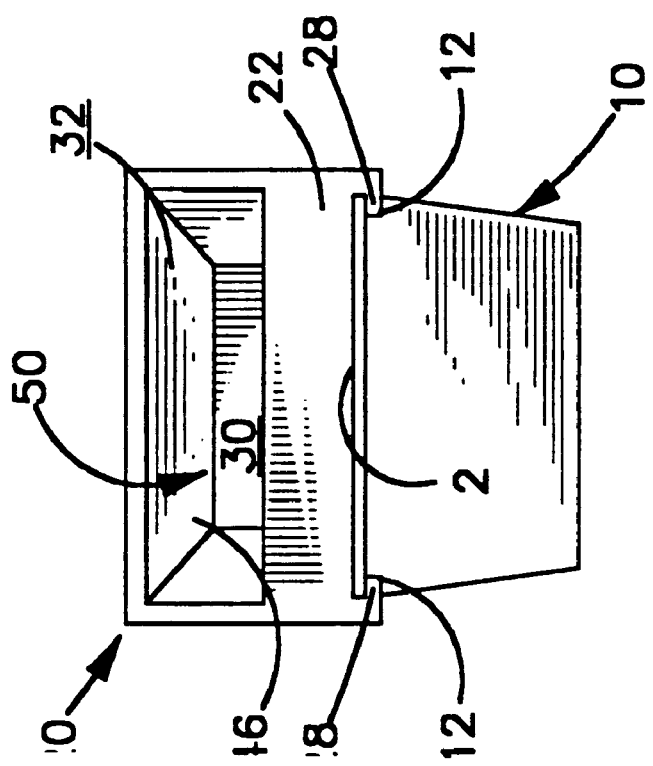
FIG. 4 is a front-bottom perspective view of one embodiment of the invention illustrating the invention in a forward-most position.

As shown most clearly in FIGS. 2–4, a pair of slots 12 are preferably positioned along opposite sides of the adjustment base 10. As shown in FIG. 4, the side walls 26 of the call box 20 are preferably provided with inward projections 28 which are sized and positioned to slidably engage the slots 12 on the adjustment base 10. As shown in FIG. 4, the inward projections 28 can be positioned on lower ends of the side walls 26.

The turkey call of the invention 1 is also preferably provided with indicia 80 on the outside of the call box 20 and indicia 80 on the adjustment base 10. The indicia 80 provide position markers for selectively positioning the sound chamber 30 relative to the sound block 50. The indicia 80 can be lines, letters, numbers, or any other marks or combinations thereof which provide a reference point or points for selecting particular positions. The indicia 80 can be provided on both sides of the invention 1, or on only one side.

The turkey call 1 can be constructed of wood, plastic, or other materials that are sufficiently durable to withstand repeated outdoor use, such as on hunting trips. The striker plate 40 can be made of slate, glass, plastic, metal (e.g. aluminum), or wood, or other materials capable of producing a turkey attracting sound.

In operation, the adjustable turkey call of the invention 1 is used by taking an embodiment of the invention 1 described herein and a conventional striker (not shown), sliding the sound chamber 30 to a desired position relative to the sound block 50, and then rubbing or striking the striker on the striker plate 40 to produce a turkey attracting sound. When a new and different turkey attracting sound is desired, the user slides the call box 20 and sound chamber 30 to a new desired position relative to the sound block 50, and repeats the step of rubbing or striking the striker on the striker plate 40 to thereby produce a new and different turkey attracting sound.

Although the present invention has been described in terms of specific embodiments, it is anticipated that alterations and modifications thereof will no doubt become apparent to those skilled in the art. It is therefore intended that the following claims be interpreted as covering all such alterations and modifications that fall within the true spirit and scope of the invention.

I claim:

1. An adjustable turkey call for producing turkey attracting sounds comprising:

an adjustment base, a pair of slots positioned along opposite sides of said adjustment base, a sound block positioned on said adjustment base, a call box, said call box forming a sound chamber, said call box having a striker plate, said call box having a pair of side walls having inward projections, and said inward projections sized and positioned to slidably engage said slots on said adjustment base such that said call box is slidably disposed on said adjustment base and such that said sound chamber can be selectively positioned relative to said sound block.

2. The turkey call of claim 1, wherein said inward projections are on lower ends of said side walls.

3. The turkey call of claim 1, further comprising indicia on said call box and indicia on said adjustment base, said indicia providing position markers for selectively positioning said sound chamber relative to said sound block.

4. An adjustable turkey call for producing turkey attracting sounds comprising:

an adjustment base, a sound block positioned on said adjustment base, and a call box, said call box forming a sound chamber, said call box having a striker plate on a top surface thereof and a pair of side walls depending downward from said top surface of said call box, said call box slidably disposed on said adjustment base such that said sound chamber can be selectively positioned relative to said sound block.

5. The turkey call of claim 4, further comprising a backstop on a back end of said call box, said backstop sized to substantially close said back end of said sound chamber.

6. The turkey call of claim 5, further comprising a front stop on a front end of said call box, said front stop positioned to contact a front end of said sound block when said call box is positioned in a rear-most position.

7. The turkey call of claim 6, wherein said striker plate is selected from the group consisting of slate, glass, plastic, metal, and wood.

8. The turkey call of claim 6, wherein said adjustment base has a substantially triangular side-view profile, said sound block has a substantially triangular side-view profile, and said call box has at least a partial triangular side-view profile.

9. The turkey call of claim 6, further comprising a pair of slots positioned along opposite sides of said adjustment base, and said side walls of said call box having inward projections, said inward projections sized and positioned to slidably engage said slots on said adjustment base.

10. The turkey call of claim 9, wherein said inward projections are on lower ends of said side walls.

11. The turkey call of claim 6, further comprising indicia on said call box and indicia on said adjustment base, said indicia providing position markers for selectively positioning said sound chamber relative to said sound block.

12. An adjustable turkey call for producing turkey attracting sounds comprising:

an adjustment base having a substantially triangular side-view profile, a sound block having a substantially triangular side-view profile, said sound block positioned on said adjustment base, a call box having, at least a partially triangular side-view profile, said call box forming a sound chamber, said call box having a duct on a front end communicating with said sound chamber, said call box having a striker plate, and said call box slidably disposed on said adjustment base such that said sound chamber can be selectively positioned relative to said sound block.

* * * * *